UNITED STATES PATENT OFFICE.

AUGUSTUS CHARLES HYDE, OF PERIVALE, ENGLAND.

MEANS TO BE EMPLOYED IN THE ELECTRIC WELDING OF IRON OR STEEL OR ALLOYS THEREOF.

1,323,768. Specification of Letters Patent. Patented Dec. 2, 1919.

No Drawing. Application filed July 8, 1919. Serial No. 309,499.

*To all whom it may concern:*

Be it known that I, AUGUSTUS CHARLES HYDE, a subject of the King of Great Britain, residing at Perivale Lodge, Perivale, in the county of Middlesex, England, have invented new and useful Improvements in Means to be Employed in the Electric Welding of Iron or Steel or Alloys Thereof, of which the following is a specification.

My invention relates to the wires, rods, tapes, and the like, which are employed, in conjunction with fluxing material, for effecting the welding of iron, or steel, or alloys thereof, under the heat of the electric arc, which will melt the said wires, or the like, and fluxing material. The fluxing material has hitherto been applied to the wire, or the like, by wrapping material, such as asbestos-string, around the wire, or the like, and applying thereto a matter in a wet condition, such as silicate of soda, the material applied being then dried, and the wire, or the like, so covered has been applied to, and moved along, the work to be welded while the heat of the electric arc is applied. The said wires, or the like, so covered with the material which acts as a flux, have been open to the objections that the joint, or welding, is not always efficiently effected, owing to the materials, as they melt under the welding heat, not combining with facility so as to adhere with certainty throughout the joint, or welding, to be made, and, moreover, the wire, or the like, to which the fluxing material has been applied as aforesaid, has been, or becomes so oxidized as to thereby injuriously affect the efficiency of the joint, or welding. It has been proposed to overcome the latter objection by including, in the covering of the wire, a wire of aluminum, or other material, which will readily oxidize and so remove the oxid, or prevent its having an injurious effect upon the joint, or welding.

The object of my invention is to overcome these objections, and this I do by applying the fluxing material, or materials, to the wire, rods, tapes, or lengths, or pieces, of iron, or steel, or alloy of either, to be used for electric welding, in such a way that it, or they, will closely adhere without any entrance of air being possible between the fluxing material, or materials, and the iron, or steel, or alloy, thereof employed. This is effected by applying, or attaching, the fluxing material, or materials, (which should have a temperature co-efficient fairly close to that of the iron or steel, or alloy thereof, used as the core) to the wires, rods, tapes, or lengths, or pieces, of iron, or steel, or alloy thereof, while the said fluxing material, or materials, is, or are, in a molten condition. A convenient way of so applying, or attaching, the said fluxing material, or materials, is to melt it, or them, in a suitable vessel and to dip the wires, rods, tapes, or lengths, or pieces, of iron, or steel, or alloy thereof, into the said molten material, or materials, or to pass the said wires, tapes, or the like, through the molten material, or materials.

Alternatively the said fluxing material, or materials, (of suitable temperature co-efficient as aforesaid) is, or are, applied, or attached, by making it, or them, into a paste, or slip, with water, or other suitable medium and immersing the wires, rods, tapes, or lengths, or pieces, of iron, or steel, or alloy thereof, therein and then drying the coating of the said paste, or slip, and fusing, or vitrifying, (where complete fusion is not required) the said coating so that it becomes attached to the said wires, rods, tapes, or lengths, or pieces.

The wires, rods, tapes, or lengths, or pieces, to be coated in accordance with my invention may be of any description of iron, or steel, or alloy of either, which may be suitable for the kind of welding to be performed, and the fluxing material, or materials, may be of any suitable kind provided that it has, or they have, a co-efficient of expansion approximately the same as that of the core to be covered and provided that the melting point of the flux is not so low as to render it unsuitable for electric welding as would be the case if the flux became so liquid in the welding process as to cause breaking of the arc during the process.

A suitable temperature for the molten mass into which the wires are to be dipped (and when using a mixture of equal parts by weight of calcined asbestos and alkaline silicate of soda glass) is 1000° centigrade. When the composition is to be employed as a paste, or slip, as hereinbefore stated, it may consist of 60 parts by weight of calcined asbestos in one part by weight of a saturated solution in water of silicate of soda, the applied coating being dried and finally heated to a temperature of 700° centigrade.

The close adherence of the coating of fluxing material, or materials, to the wires, rods, tapes, or lengths, or pieces, of iron, or steel, or alloy thereof, will prevent oxidation of the said wires, rods, tapes, or lengths, or pieces, and the iron, or steel, or alloy thereof, and flux will combine and run evenly into the joint, or welding, being made and insure a very efficient jointing, or weld.

I am aware that it has been proposed to apply a flux to the surface of a sheet of brazing metal and to vitrify, or solidify, the flux by heat so as to form a vitreous enamel, glaze, or film, on the surface of the brazing metal and I make no claim to that process, or the product thereof.

In the expression "iron containing electrode" in the following claim, I include any suitable form of rod, wire, tape, or length, or piece, of iron, or steel, or alloy of either.

What I claim is:—

For use in electric welding, an iron containing electrode, to which has been applied an adherent coating of flux material, such as a mixture containing asbestos and silicate of soda fused, or vitrified, thereon; substantially as hereinbefore explained.

In testimony whereof I have signed my name to this specification in the presence of two subscribing witnesses.

AUGUSTUS CHARLES HYDE.

Witnesses:
    PERCY READ GOLDING,
    WILFRED ROMAINE YEADELL.